United States Patent

Fukumoto et al.

[11] 4,000,613
[45] Jan. 4, 1977

[54] DUAL MODE FLUID MANAGEMENT SYSTEM

[75] Inventors: Akiharu Fukumoto, Milpitas; Phil D. La Force, San Jose, both of Calif.

[73] Assignee: The United States of America as represented by the Secretary of the Navy, Washington, D.C.

[22] Filed: Feb. 13, 1975

[21] Appl. No.: 550,103

[52] U.S. Cl. .................. 60/251; 60/258; 60/39.74 A; 239/417; 239/584

[51] Int. Cl.² ............. F02K 9/06; B05B 7/12

[58] Field of Search ............ 60/39.74 A, 39.74 B, 60/39.74 R, 251, 258; 239/416.5, 417, 417.3, 584; 137/625.35, 625.38; 251/117

[56] References Cited

UNITED STATES PATENTS

| | | | |
|---|---|---|---|
| 2,085,800 | 7/1937 | Goddard | 60/258 |
| 2,214,757 | 9/1940 | Alden | 239/584 |
| 2,411,667 | 11/1946 | Mowrey | 251/117 |
| 2,720,845 | 10/1955 | Whitlock | 251/117 |
| 3,064,903 | 11/1962 | Butler | 60/258 |
| 3,216,693 | 11/1965 | Hook | 60/39.74 A |
| 3,431,733 | 3/1969 | Hamrick | 60/258 |
| 3,515,353 | 6/1970 | Young et al. | 60/258 |
| 3,742,701 | 7/1973 | Feemster et al. | 60/251 |

FOREIGN PATENTS OR APPLICATIONS

| | | | |
|---|---|---|---|
| 1,318,819 | 1/1962 | France | 239/416.5 |
| 66,712 | 9/1943 | Norway | 251/117 |

*Primary Examiner*—William L. Freeh
*Assistant Examiner*—Robert E. Garrett
*Attorney, Agent, or Firm*—R. S. Sciascia; Roy Miller

[57] ABSTRACT

A dual orifice injector assembly for use in a hybrid rocket motor having a boost and sustain mode and capable of controlling liquid flow rate for the two different modes of operation comprising an inlet manifold to distribute the fluid through a sustain injector and boost injector, actuating means for axially moving the sustain injector into a position to close off the boost injector for the sustain mode of operation and a flow deflector to cause the fluid to be dispersed in a fan like pattern at an angle 180° to the axis of the manifold housing.

3 Claims, 2 Drawing Figures

DUAL MODE FLUID MANAGEMENT SYSTEM

BACKGROUND OF THE INVENTION

1. Field of the Invention.

The invention is concerned with an oxidizer injection system, capable of controlling the flow rates during the boost and sustain modes of a hybrid rocket motor.

SUMMARY OF THE INVENTION

The invention comprises a housing, boost flow control injector, sustain flow control injector and a splash plate which produces a flat 180-degree spray under both boost and sustain flow conditions. The sustain flow control injector is contained in a poppet which is caused to move axially under the influence of an actuator to close off the boost control orifice during the sustain mode.

DESCRIPTION OF THE PREFERRED EMBODIMENT

Figure 1:
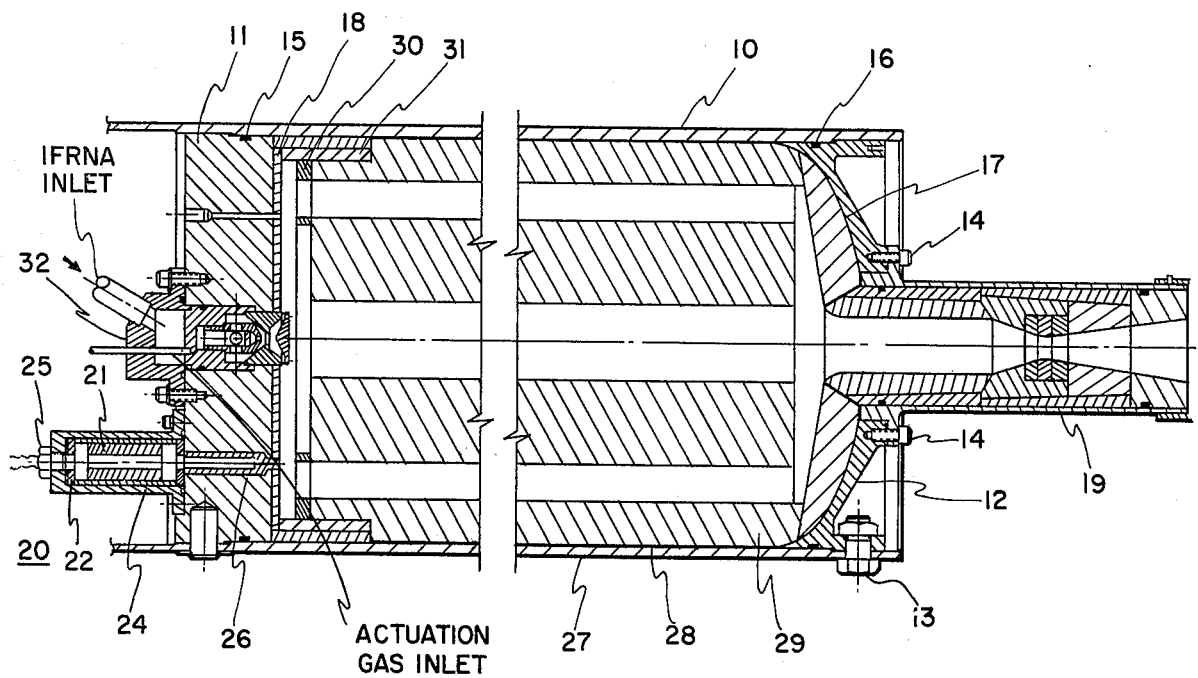
FIG. 1 is a cross-section of the overall rocket motor.

As shown in FIG. 1 motor case 10 is connected to fore and aft closures 11 and 12 by shear bolt joints as indicated at 13. O-rings 15 and 16 are used to seal the fore and aft closures, respectively, in the motor case. The two-to-one ellipsoidal surface 17 of the aft closure insulation is made of either a molded silica-phenolic material or a trowelable asbestos-loaded PB (polybutadiene) material. A laminated plate of asbestos-phenolic 18 is used to insulate the flat forward closure 11. No shear bolts are shown in the cross section of FIG. 1 for the forward closure 11, however, the same match-drilled pattern as that of the aft closure 12 applies to the forward closure 11.

A conventional heat sink ablative nozzle 19 with a blast tube and a pyrolytic-graphite throat insert make up the nozzle assembly which is bolted and sealed with O-rings to the aft closure as by bolts 14. An initiator assembly 20 and injector assembly 32 are bolted to the forward closure and sealed with O-rings at each interface.

A solid propellant initiator grain 21 is used in the initiator assembly 20 with asbestos-phenolic insulation 22 between the forward end theereof and a steel housing 24. A squib ignitor 25 is threaded into the housing 24 and a graphite throat insert 26 completes the initiator assembly 20.

A dual orifice injector assembly 32 which produces a 180° fan spray pattern is used for the oxidizer boost and sustain flows. The details of the solid motor and the initiator assembly do not form part of the present invention and therefore are not gone into in great detail. However, it is sufficient to say that there is a motor case 27, liner 28, grain 29, ignitor grain 30 and silicon rubber insulation 31 all located as shown in FIG. 1.

Figure 2:
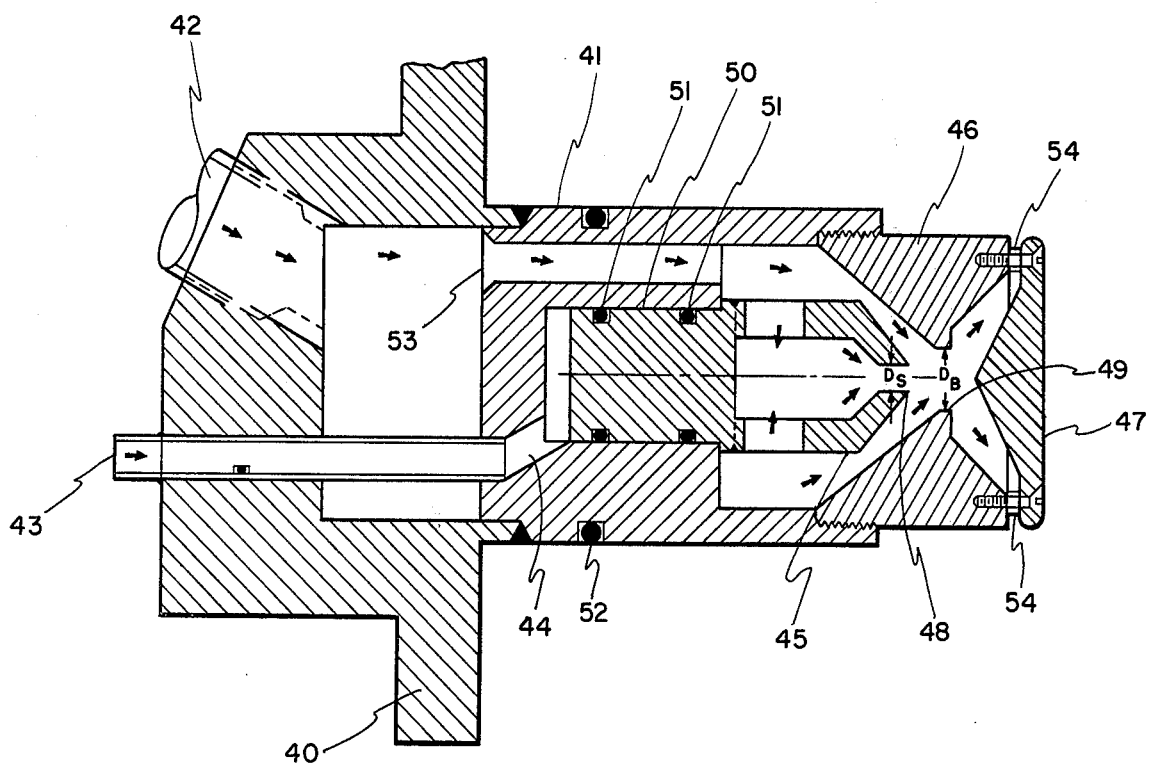
FIG. 2 is a cross-section through the center axis of the injector.

The oxidizer injection system which comprises the present invention is shown in FIG. 2 and consists of an inlet housing 40, manifold housing 41, oxidizer inlet 42, high-pressure gas inlet 43, high-pressure gas cavity 44, sustain injector poppet 45, boost injector seat 46, flow deflector 47, sustain injector orifice 48 and boost injector orifice 49.

The sustain injector poppet is contained within a central bore 50 of the manifold housing 41 in a gas tight sealing relationship by O-rings 51. O-ring 52 is provided as a seal between the forward closure and the manifold housing when the injector assembly is in position in the rocket motor of FIG. 1.

In operation, inhibited red fuming nitric acid (IRFNA) flows through the oxidizer inlet 42, which is a single manifold, into seven 1/4 inch diameter holes, one of which is shown at 53. The holes in turn deliver the oxidizer to the sustain and boost injectors. During the boost phase, a small portion of the oxidizer flows through the sustain injector. However, the boost control orifice 49 is downstream of the sustain orifice 48; thus the boost orifice 49 controls the total boost flow rate. To terminate the boost control, high-pressure gas is directed through high-pressure gas inlet 43 to actuate the sustain injector poppet 45 until it comes in contact with the boost injector seat and thus reduces the oxidizer flow to that which goes through the sustain injector orifice 48. The seat 46 and sustain poppet 45 are made of stainless steel because it has been found that the hard metal-to-metal surface contact produces the best seal in a pintle/seat-type configuration. In order to achieve the desired 180° fan spray pattern, the oxidizer from the injectors is impinged on a flow deflector 47 which turns the oxidizer perpendicular to the center line of the motor and creates a sheet of spray. The deflector 47 and spacers 54 are made of stainless steel also.

Overall motor operation is as follows. Motor operation begins with ignition of the squib ignitor 25 which ignites the initiator grain 21 and it in turn ignites the solid propellant ignitor wafer 30 which is bonded to the hybrid fuel grain 29. The hybrid fuel grain 29, which is loaded with AP (Ammonium Perchlorate), is ignited by the ignitor wafer 30. Oxidizer flow starts into the motor between 0.2 and 0.4 seconds after ignition of the squib. Oxidizer flow is maintained at the desired boost level for 10 to 12 seconds and then the dual orifice injector 32 is actuated by bleeding high-pressure gaseous nitrogen ($GN_2$) into the injector and closing off the boost flow area $D_B$ so that only the sustain flow area $D_S$ is open. Sustain flow is then maintained at the required level until burnout.

What is claimed is:

1. A dual orifice injector assembly for use in a hybrid rocket motor having a boost and sustain mode comprising;
    said assembly having an inlet housing and manifold housing;
    said manifold housing having an inner bore;
    a sustain injector poppet slideably mounted within said bore;
    a sustain injector orifice at one end of said poppet;
    a boost injector seat mounted on one end of said manifold housing;
    a boost injector orifice contained in said seat;
    an inlet manifold in said inlet housing in open communication with said sustain injector and boost injector in the boost mode of said rocket motor;
    actuating means acting on said poppet to cause the poppet to seat against said boost injector seat in the sustain mode of said rocket motor; and
    flow deflector means in flow communication with said boost injector and sustain injector to cause fluid from said injectors to be dispersed in a fan like pattern at substantially right angles to the axis of said manifold housing.

2. A dual orifice injector as set forth in claim 1 wherein;
said sustain injector orifice and said boost injector orifice are in axial alignment with each other so that fluid issuing from said sustain injector passes through said boost injector in the boost mode.

3. A dual orifice injector assembly as set forth in claim 1 wherein;
said sustain injector has a central opening therein in alignment with the axis of the manifold housing;
said boost injector has a central opening therein in alignment with the central axis of the manifold housing;
said sustain injector in the sustain mode being seated against the boost injector seat so that the sustain injector effectively closes off the opening in the boost injector which is in communication with the inlet manifold in the boost mode.

* * * * *